(12) United States Patent
Yamada et al.

(10) Patent No.: US 12,246,735 B2
(45) Date of Patent: Mar. 11, 2025

(54) IN-VEHICLE ELECTRONIC CONTROL SYSTEM

(71) Applicant: Hitachi Automotive Systems, Ltd., Hitachinaka (JP)

(72) Inventors: Tetsuya Yamada, Tokyo (JP); Kentaro Yoshimura, Tokyo (JP); Shouji Muramatsu, Ibaraki (JP); Tsutomu Kaneko, Ibaraki (JP); Toshiyuki Innami, Ibaraki (JP); Koichi Yokoura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 981 days.

(21) Appl. No.: 17/268,017

(22) PCT Filed: Aug. 6, 2019

(86) PCT No.: PCT/JP2019/030826
§ 371 (c)(1),
(2) Date: Feb. 11, 2021

(87) PCT Pub. No.: WO2020/066304
PCT Pub. Date: Apr. 2, 2020

(65) Prior Publication Data
US 2021/0179123 A1 Jun. 17, 2021

(30) Foreign Application Priority Data
Sep. 28, 2018 (JP) .................. 2018-184326

(51) Int. Cl.
*B60W 50/02* (2012.01)
*B60T 7/12* (2006.01)
(Continued)

(52) U.S. Cl.
CPC ........... *B60W 50/0225* (2013.01); *B60T 7/12* (2013.01); *B60W 30/09* (2013.01);
(Continued)

(58) Field of Classification Search
None
See application file for complete search history.

(56) References Cited

U.S. PATENT DOCUMENTS

2011/0307142 A1 12/2011 Yanagi et al.
2018/0151076 A1 5/2018 Hirotsu
(Continued)

FOREIGN PATENT DOCUMENTS

JP 2017-47694 A 3/2017
JP 2017-92835 A 5/2017
(Continued)

OTHER PUBLICATIONS

International Search Report (PCT/ISA/210) issued in PCT Application No. PCT/JP2019/030826 dated Dec. 10, 2019 (two (2) pages).
(Continued)

*Primary Examiner* — Lail A Kleinman
(74) *Attorney, Agent, or Firm* — Crowell & Moring LLP

(57) ABSTRACT

Fail-safe is performed appropriately when an automatic driving ECU has a failure. Provided is an in-vehicle electronic control system including a recognition device that recognizes a situation outside a vehicle, a track calculation unit that calculates a track on which the vehicle travels, a failure diagnosis unit that diagnoses a failure of the track calculation unit, and an output unit that outputs a control signal used to control the vehicle, in which a control signal generated based on a brake control instruction generated by the recognition device and a control signal generated based on a track control instruction generated by the track calculation unit are input to the output unit, and when the failure diagnosis unit diagnoses that the track calculation unit has a failure, the output unit outputs a control signal generated based on the brake control instruction generated by the recognition device.

12 Claims, 13 Drawing Sheets

(51) Int. Cl.
    *B60W 30/09*     (2012.01)
    *B60W 50/035*     (2012.01)

(52) U.S. Cl.
    CPC ..... *B60W 50/035* (2013.01); *B60W 2050/021* (2013.01); *B60W 2420/403* (2013.01); *B60W 2420/408* (2024.01)

(56) References Cited

U.S. PATENT DOCUMENTS

| | | |
|---|---|---|
| 2018/0170374 A1 | 6/2018 | Otsuka et al. |
| 2018/0178789 A1 | 6/2018 | Nishimura et al. |
| 2018/0281816 A1 | 10/2018 | Otsuka et al. |
| 2019/0300010 A1* | 10/2019 | Miyauchi ............ B60W 50/035 |
| 2020/0062246 A1* | 2/2020 | Park .................... B60W 30/09 |
| 2020/0290641 A1 | 9/2020 | Kawakami |
| 2021/0163026 A1* | 6/2021 | Ochida ............. B60W 60/0015 |

FOREIGN PATENT DOCUMENTS

| | | |
|---|---|---|
| JP | 2018-106233 A | 7/2018 |
| JP | 6381835 B1 | 8/2018 |
| WO | WO 2010/103768 A1 | 9/2010 |
| WO | WO 2017/002590 A1 | 1/2017 |

OTHER PUBLICATIONS

Japanese-language Written Opinion (PCT/ISA/237) issued in PCT Application No. PCT/JP2019/030826 dated Dec. 10, 2019 (six (6) pages).

* cited by examiner

IN-VEHICLE ELECTRONIC CONTROL SYSTEM

TECHNICAL FIELD

The present invention relates to an in-vehicle electronic control system mounted on a vehicle such as an automobile.

BACKGROUND ART

In automatic driving, a sensor such as a camera and a radar "recognizes" the surrounding situation, artificial intelligence (machine learning) "determines" the response to the surrounding situation, and an actuator "operates" a vehicle by operating a throttle, a brake, or the like according to the determination.

Generally, an automatic driving ECU (AD-ECU) is mounted on a vehicle that performs automatic driving. The automatic driving ECU performs sensor fusion and local dynamic map processing of adding recognition information output from a plurality of sensors as dynamic data in multiple layers on a map of the vicinity of own vehicle traveling, and track calculation processing of performing processing of calculating the risk on a local dynamic map, and calculating an optimum track on which the own vehicle should travel. There is also an ECU that performs raw data fusion processing of inputting raw data before processing, instead of recognition information from a plurality of sensors, directly into the automatic driving ECU, and performing recognition processing and data aggregation processing.

The following prior arts are the background technologies in this technical field. PTL 1 (JP 2017-47694 A) discloses a vehicle control device that outputs at least one of a first control signal generated on the basis of automatic driving control information and a second control signal generated on the basis of relative information between own vehicle and a surrounding object to a drive device, and outputs the second control signal to the drive device in place of the first control signal when an abnormality is detected in the automatic driving control information.

CITATION LIST

Patent Literature

PTL 1: JP 2017-47694 A

SUMMARY OF INVENTION

Technical Problem

There are the following two problems in a system equipped with an automatic driving ECU.
(1) Failure: Fail-safe to avoid accidents even if the automatic driving ECU has a failure, or fail-operation to continue driving to a safe place
(2) Sudden event: Avoiding danger against a sudden event such as a motorcycle or a person jumping out on the track specified by the automatic driving ECU For the failure of the automatic driving ECU in (1), a redundant configuration with two automatic driving ECUs is conceivable, but the cost increases. Therefore, it is desired to achieve fail-safe or fail operation by substituting some functions of the automatic driving ECU with another device.

For the sudden event in (2), the automatic driving ECU performs processing of converting the values of a plurality of sensors in different coordinate systems into coordinates and superimposing (fusion) the coordinates, and calculating an optimum track in consideration with efficiency and riding comfort in addition to safety, and therefore, the process cycle is long and it is difficult to follow an event that occurs suddenly. In the future, it is expected that the amount of data to be processed will increase further due to the increase in the amount of data to be processed for performing fusion on raw data and due to the recognition processing in advanced machine learning.

For these problems, PTL 1 proposes that an external sensor such as a camera and a radar is used to perform control using relative information of the external sensor, that is, fail operation for (1) a failure. Further, PTL 1 proposes calculating the collision risk from the relative position, relative speed, and relative acceleration, and switching the control from the automatic driving ECU to the control based on the external sensor according to the calculated risk value, for (2) a sudden event.

However, for the fail operation at the time of a failure and the sudden event, the matters to be performed are different, and it is difficult to solve them by the same measures.

In a sudden event, for example, a motorcycle that jumps out of behind an oncoming vehicle at an intersection moves and changes position even in a short time of 100 milliseconds. If there is a high possibility of collision with this motorcycle, it is necessary to stop the vehicle so as not to collide, and it is important to perform processing of appropriately determining the stop in a short time. On the other hand, in the fail operation at the time of failure, it is necessary to continue the automatic driving processing in order to move to a safe place. Different processes are required for the processing of determining the stop in a short time to avoid collision and the automatic driving processing for moving to a safe place.

For these problems, in PTL 1, the degree of danger (risk) for each object output from the sensor is calculated from the relative position, relative speed, relative acceleration, and the like, on the basis of whether the object is on the own vehicle's track. Improving the accuracy of risk calculation using information from a plurality of sensors is suitable for fail operation in the event of a failure, but it increases the amount of processing. Since the risk calculation result does not include a time element, there is a problem that the control amount and timing of the brake for a sudden event cannot be determined.

Therefore, the present invention proposes a method of appropriately performing fail-safe or fail operation when the automatic driving ECU has a failure, and a method of achieving both a response to a sudden event and fail-safe or fail operation at the time of a failure.

Solution to Problem

A representative example of the invention disclosed in the present application is as follows. That is, provided is an in-vehicle electronic control system including a recognition device that recognizes a situation outside a vehicle, a track calculation unit that calculates a track on which the vehicle travels, a failure diagnosis unit that diagnoses a failure of the track calculation unit, and an output unit that outputs a control signal used to control the vehicle, in which a control signal generated based on a brake control instruction generated by the recognition device and a control signal generated based on a track control instruction generated by the track calculation unit are input to the output unit, and when the failure diagnosis unit diagnoses that the track calculation unit has a failure, the output unit outputs a control signal generated based on the brake control instruction generated by the recognition device.

Advantageous Effects of Invention

According to an aspect of the present invention, fail-safe can be appropriately performed when an automatic driving ECU has a failure, and the danger due to a sudden event can be avoided. The problems, configurations, and effects other than those described above will be clarified from the description of the embodiments below.

DESCRIPTION OF EMBODIMENTS

Figure 1:
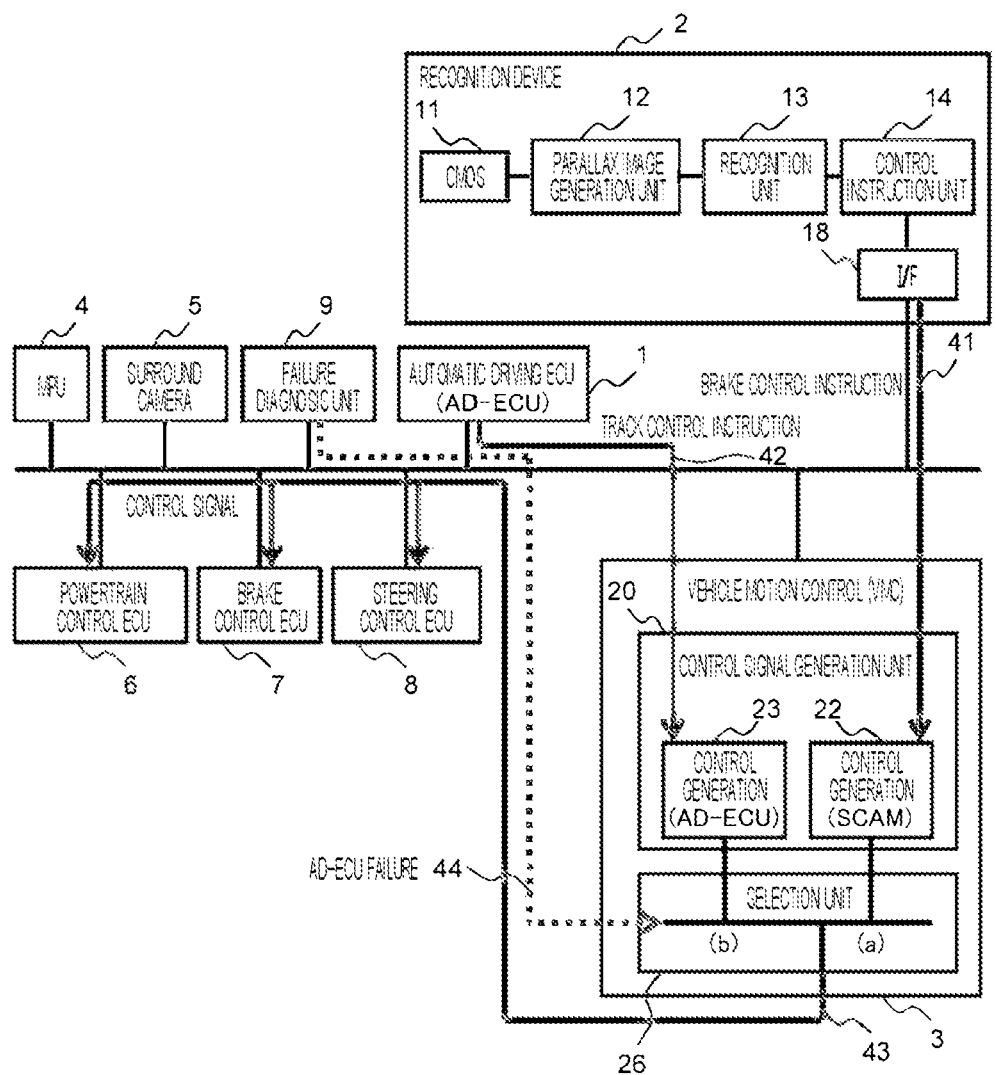
FIG. 1 is a block diagram showing a configuration of an in-vehicle electronic control system for automatic driving according to a first embodiment.

Embodiments of the present invention will be described below with reference to the drawings. In the embodiments of the present invention, an in-vehicle electronic control system for automatic driving that is mounted on a vehicle such as an automobile and generates a track on which the vehicle travels autonomously on the basis of external conditions and map information acquired from a plurality of sensors such as cameras will be described.

In the in-vehicle electronic control system of the embodiments of the present invention, (1) when fail-safe is performed when an automatic driving ECU 1 has a failure, control is switched to control based on an output from a recognition device 2 (emergency brake calculation unit 15) to stop a vehicle safely.

For (2) a sudden event, the recognition device 2 (emergency brake calculation unit 15) such as a stereo camera and the like calculates a time to collision (TTC) 45 of collision with an object on a track of an own vehicle travel path and outputs the TTC, so that the control amount and timing of the brake are appropriately controlled. Although the recognition device 2 and the like perform a plurality of processes such as lane keeping and adaptive cruise control (ACC) in addition to the brake control, the recognition device 2 and the like calculate the time to collision 45 and the brake control instruction 41 prior to the other processes, and output the calculation result in a short cycle (for example, several tens of milliseconds) to stop a vehicle safely. Further, the timing for switching to the brake control on the recognition device 2 side is determined on the basis of the time to collision 45.

When (1) fail operation is performed for a failure of the automatic driving ECU 1, some functions of the automatic driving ECU 1 are reconstructed in another ECU. Since the reconstruction takes time, a sudden event during the reconstruction and after completion of the reconstruction are responded with (2) so as not to lose control during the reconstruction.

That is, in the embodiments of the present invention, from a plurality of controls, (1) in the fail-safe for a failure of the automatic driving ECU 1, when the automatic driving ECU 1 has a failure, control is switched to control based on an output from the recognition device 2 (emergency brake calculation unit 15) to stop a vehicle safely, and (1) in the fail operation for a failure of the automatic driving ECU 1, control is switched to control based on an output from some functions of the automatic driving ECU 1 reconstructed in another ECU to guide a vehicle to a safe position. Further, for (2) a sudden event, regardless of whether or not the automatic driving ECU 1 has a failure, the time to collision 45 and the brake control instruction calculated in advance by the recognition device 2 are used to switch control to control based on the brake control instruction 41 to stop a vehicle safely. As a result, if a sudden event occurs, not only during normal operation but also during either fail-safe or fail operation processing at a time of a failure of the automatic driving ECU 1, priority is given to response to the sudden event, and a vehicle is stopped safely on the basis of the time to collision, and so that accidents can be avoided.

First Embodiment

FIG. 1 is a block diagram showing a configuration of an in-vehicle electronic control system for automatic driving according to a first embodiment.

In the first embodiment, in response to the problem (1) described above, control is switched between track control by the automatic driving ECU 1 and brake control by the recognition device 2 to achieve fail-safe at the time of an ECU failure.

The in-vehicle electronic control system for automatic driving of the first embodiment includes the automatic driving ECU (AD-ECU) 1, the recognition device 2, a vehicle motion control unit (vehicle motion controller (VMC)) 3, a powertrain control ECU 6, a brake control ECU 7, a steering control ECU 8 and a failure diagnosis unit 9. The in-vehicle electronic control system may have a map unit (MPU) 4 and a surround camera 5 as shown in the drawing.

The automatic driving ECU (AD-ECU) 1 is an electronic control device that functions as a track calculation unit that calculates a track on which a vehicle travels. The automatic driving ECU (AD-ECU) 1 has a processor that executes a program and a memory that stores the program. Data used during the execution of the program is also stored in the memory.

The recognition device 2 is a device capable of detecting an object around the vehicle and measuring the relative distance and the relative speed with the object. For example, when the recognition device 2 is configured by a stereo camera (SCAM), the recognition device 2 has imaging devices 11, a parallax image generation unit 12, a recognition unit 13, a control instruction unit 14, and an interface unit 18. In the recognition device 2, the parallax image generation unit 12 generates images (parallax image, edge image, and the like) necessary for recognition from raw images (bayer images) of the periphery captured by the two imaging devices 11, the recognition unit 13 performs recognition processing using the generated images, the control instruction unit 14 generates the brake control instruction 41 from the relative distance and the relative speed with the recognized object, and the interface unit 18 outputs the generated brake control instruction 41 to the outside.

The recognition device 2 can be configured by one or a combination of a stereo camera, a monocular camera, a laser radar, a millimeter wave radar, a LIDER, an ultrasonic sensor, and the like. In the first embodiment, since the recognition device 2 only needs to generate the brake control instruction 41 and does not require various pieces of information, the recognition device 2 can be configured by using various sensors.

The vehicle motion control unit 3 has a control signal generation unit 20 and a selection unit 26. The control signal generation unit 20 has a control generation unit (SCAM) 22 and a control generation unit (AD-ECU) 23.

The control generation unit 22 generates a control signal for controlling various actuators (accelerator, brake, steering, and the like) by at least one of the powertrain control ECU 6, the brake control ECU 7, and the steering control ECU 8, from the brake control instruction 41 received from the recognition device 2. That is, when the vehicle is stopped on the basis of the brake control instruction 41 received from the recognition device 2, the control generation unit 22 generates an emergency brake control signal, and the vehicle is stopped by the control of the brake control ECU 7. Further, when an object approaching from behind is avoided by acceleration on the basis of the brake control instruction 41 received from the recognition device 2, the control generation unit 22 generates an acceleration control signal and a vehicle speed is accelerated by the control of the powertrain control ECU 6. Further, when an object is avoided by steering on the basis of the brake control instruction 41 received from the recognition device 2, the control generation unit 22 generates a steering control signal and changes the travel direction of the vehicle by the control of the steering control ECU 8. Note that, in the following, the emergency brake control signal generated on the basis of the brake control instruction 41 will be described, but the acceleration and steering control signals described above may also be used. Two or more of brake control, acceleration control, and steering control may be combined (for example, a combination of brake control and steering control) to perform control. As described above, since the control is performed by the brake control instruction 41 by one or a combination of the brake, the powertrain, and the steering, the danger can be avoided even if an event that cannot be avoided only by stopping on the track occurs.

The control generation unit 23 generates a control signal for controlling various actuators by at least one of the powertrain control ECU 6, the brake control ECU 7, and the steering control ECU 8, from the track control instruction 42 such as the steering angle and speed received from the automatic driving ECU 1.

The failure diagnosis unit 9 periodically checks an operation status of the automatic driving ECU 1 by periodically confirming the existence (heartbeat), detecting an abnormality by an electric circuit (detecting an abnormal voltage), detecting a communication abnormality (detecting an error such as CRC), and the like, and when determining that the automatic driving ECU 1 has a failure, outputs the AD-ECU failure signal 44. A failure is a state different from the normal state that occurs due to a hardware failure, a software failure, an unexpected input, or the like.

The selection unit 26 functions as an output unit that selects the control signal on the automatic driving ECU 1 side and the control signal on the recognition device 2 side and outputs the selected control signal. Specifically, the selection unit 26 uses the AD-ECU failure signal 44 output from the failure diagnosis unit 9 to select the control signal (a) on the recognition device 2 side when the automatic driving ECU 1 has a failure, and selects the control signal (b) on the automatic driving ECU side when the automatic driving ECU 1 is in the normal state.

In the present embodiment, the control generation units 22 and 23 that generate the control signal and the selection unit 26 that selects the control signal are separately provided, but the control generation units 22, 23 and the selection unit 26 may be integrated to configure the output unit that outputs a control signal to the ECUs 6 to 8.

Figure 2:
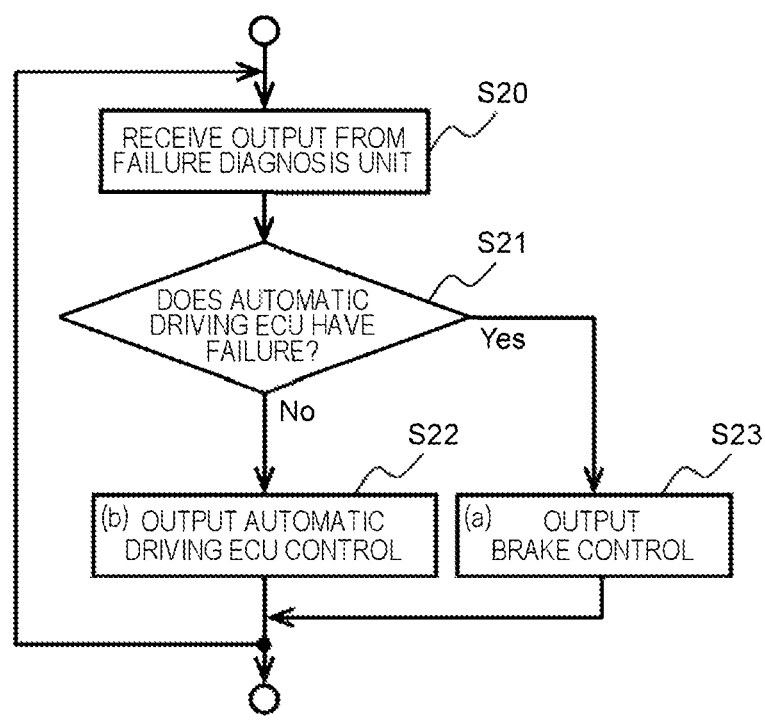
FIG. 2 is a flowchart of control selection processing of the first embodiment.

FIG. 2 is a flowchart of the control selection processing by the selection unit 26 of the vehicle motion control unit 3 of the first embodiment. The illustrated control selection processing is repeatedly performed at a predetermined timing (for example, at intervals of several hundred milliseconds) according to the failure diagnosis cycle.

The failure diagnosis unit 9 periodically diagnoses the operation state of the automatic driving ECU 1 and notifies the vehicle motion control unit 3 of the result of the diagnosis. The vehicle motion control unit 3 receives the diagnosis result output from the failure diagnosis unit 9 (S20), and determines whether the automatic driving ECU 1 has a failure on the basis of the diagnosis result (S21).

If the automatic driving ECU 1 is in the normal state (No in step S21), the selection unit 26 selects and outputs the control signal (b) generated on the basis of the track control instruction 42 output by the automatic driving ECU (S22). On the other hand, when the automatic driving ECU 1 has a failure (Yes in step S22), the selection unit 26 selects and outputs the control signal (a) generated on the basis of the brake control instruction 41 output by the recognition device 2 (S23).

As described above, in the first embodiment, when the automatic driving ECU 1 has a failure, the control by the automatic driving ECU 1 is disconnected and the control is immediately switched to the control by the recognition device 2, and the stop processing by the brake control is performed without losing the control, so that the reliable fail-safe can be performed.

Further, since the control can be switched to emergency brake control without calculating risk values that require a large amount of calculation using relative information (relative position, relative speed) between own vehicle and an obstacle, control can be quickly switched to emergency brake control and the vehicle can be stopped reliably.

Second Embodiment

Next, a second embodiment will be described. In the second embodiment, a method of switching control between track control by the automatic driving ECU 1 and brake control by the recognition device 2 to deal with both the above-mentioned problems (1) fail-safe at the time of a failure and (2) danger avoidance in a sudden event. Note that, in the second embodiment, the difference from the first embodiment will be described, the same configurations and functions as those in the first embodiment will be designated by the same reference numerals, and the description thereof will be omitted.

Figure 3:
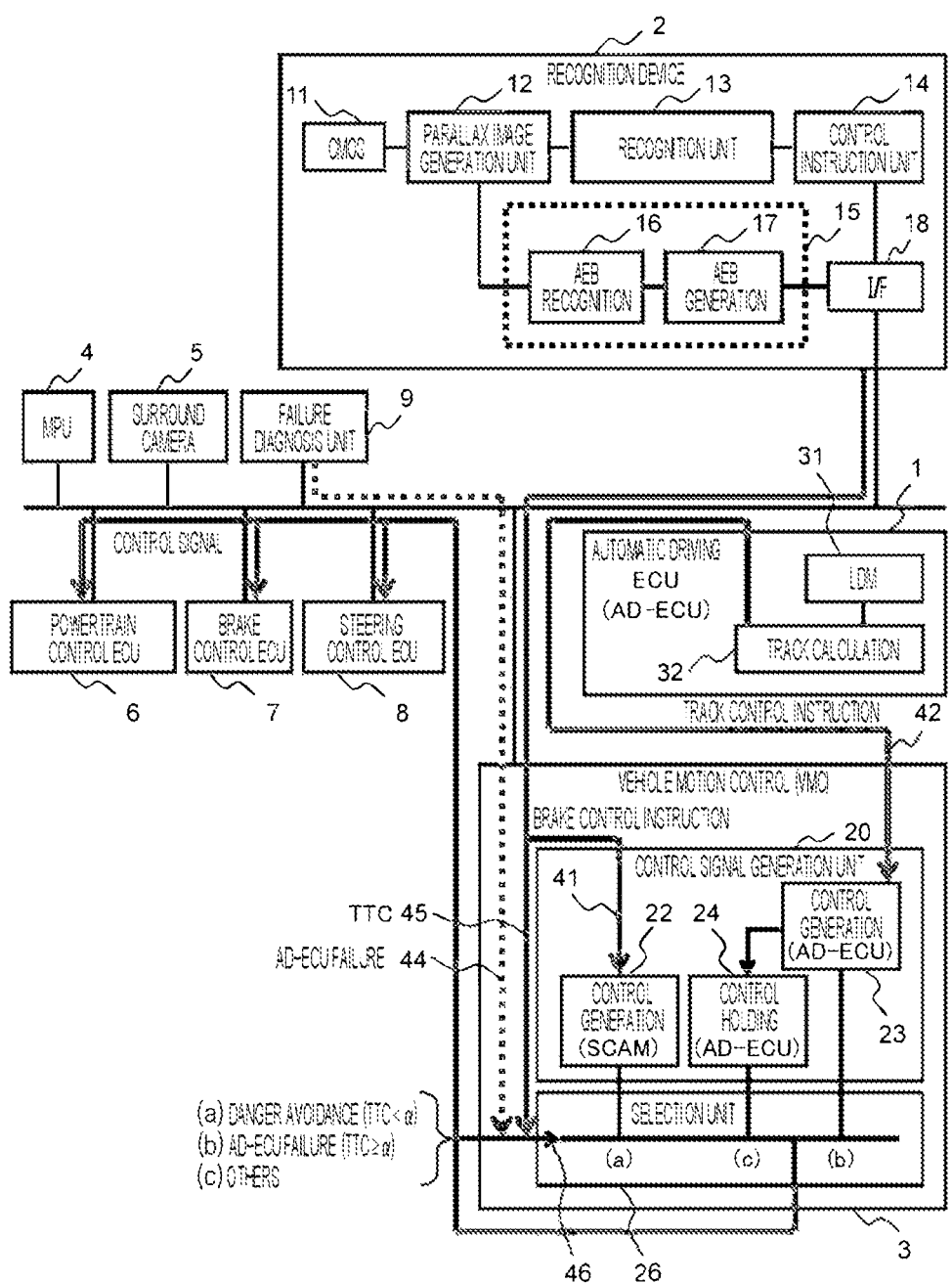
FIG. 3 is a block diagram showing a configuration of an in-vehicle electronic control system for automatic driving according to a second embodiment.

FIG. 3 is a block diagram showing a configuration of an in-vehicle electronic control system for automatic driving according to the second embodiment.

Figure 4:
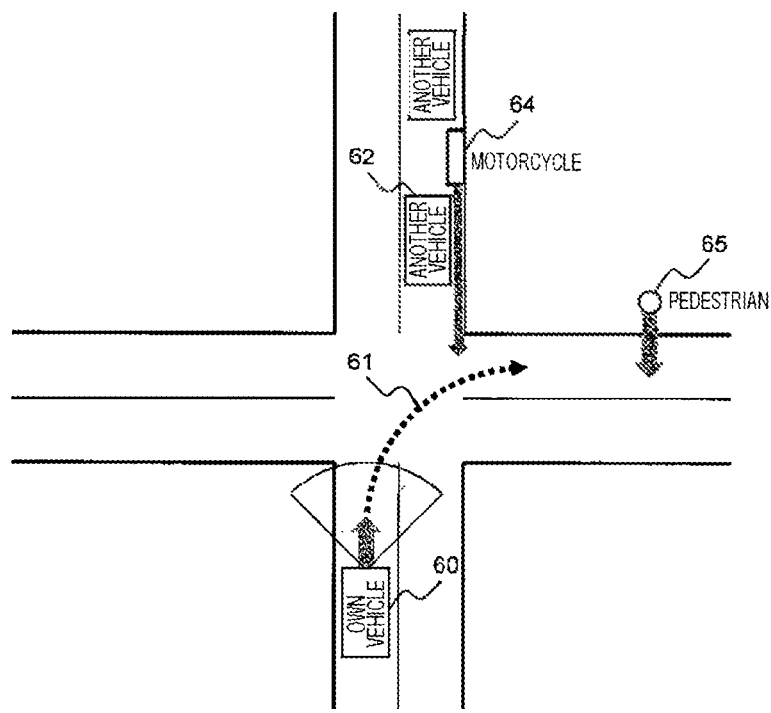
FIG. 4 is a diagram for explaining an example of a sudden event.

First, an example of a sudden event will be described with reference to FIG. 4. The automatic driving ECU 1 generates the track control instruction 42 indicating the track 61 on which the automatic driving ECU 1 should go, from the state of the own vehicle 60 and another vehicle 62 approaching an intersection. At this time, a motorcycle 64 that cannot be seen behind another vehicle 62 or a pedestrian 65 may suddenly pop out after turning right.

Returning to FIG. 3, the automatic driving ECU 1 has a local dynamic map unit (LDM) 31 and a track calculation unit 32, coordinates the recognition results of a plurality of sensors, maps the coordinates to a local dynamic map, and calculates a target, and therefore, the processing time is long and it may not be possible to respond to sudden changes in events. Therefore, a dedicated circuit of the recognition device 2 (emergency brake calculation unit 15) calculates the time to collision 45 and the brake control instruction 41 indicating the necessity of emergency brake in a short cycle (for example, several tens of milliseconds), and outputs the brake control instruction 41 before the automatic driving ECU 1 that operates in several hundreds of milliseconds. Then, when the time to collision 45 is equal to or less than a predetermined threshold, the selection unit 26 selects the brake control instruction 41 on the recognition device 2 side.

First, the recognition device 2 recognizes not only objects (three-dimensional objects) around the vehicle, but also lanes, lights (light distribution), signs, and the like, and generates a plurality of control instructions such as lane keeping system (LKS), adaptive cruise control (ACC), and adaptive high beam (AHB). In recent years, the resolution of the imaging device 11 tends to be high, and the processing load of the recognition device 2 has become large.

Therefore, the recognition device 2 is provided with the emergency brake calculation unit 15 that performs calculation by limiting the functions to the time to collision 45 and the emergency brake control instruction autonomous emergency brake (AEB) 41, and the output cycle of the brake control instruction 41 is shortened, and thereby, a vehicle is quickly controlled according to the latest situation. The emergency brake calculation unit 15 has an emergency brake recognition unit 16 and an emergency brake signal generation unit 17. The details of the configuration of the emergency brake calculation unit 15 will be described later with reference to FIG. 5.

In the second embodiment, the recognition device 2 can be configured by one or a combination of a stereo camera, a monocular camera, a laser radar, a millimeter wave radar, a LIDER, an ultrasonic sensor, and the like. In the second embodiment, since the recognition device 2 only needs to generate the brake control instruction 41 and the time to collision 45 and does not require various pieces of information, the recognition device 2 can be configured by using various sensors.

In the vehicle motion control unit 3 of the second embodiment, an option for avoiding danger is added to the control signal generation unit 20 and the selection unit 26. Specifically, in the selection unit 26, (a) an option for avoiding danger is added to (b) an option at the time of the normal state of the automatic driving ECU 1 and (c) an option at the time of a failure of the automatic driving ECU 1. For the danger avoidance, it is preferable that a value of the threshold α of the time to collision 45 output from the recognition device 2, for example, α=2 seconds. Note that the threshold α may be changed depending on the speed of the vehicle.

The AD-ECU failure signal 44 output from the failure diagnosis unit 9 and the time to collision 45 output from the recognition device 2 are input to the selection unit 26 as the selection control signal 46.

The control signal generation unit 20 has a control generation unit (SCAM) 22 that generates a control signal for danger avoidance on the basis of the brake control instruction 41 output from the recognition device 2, a control generation unit (AD-ECU) 23 that generates a control signal on the basis of the track control instruction 42 output from the automatic driving ECU 1 when the automatic driving ECU 1 is in the normal state, and a control signal holding unit 24 that holds the control signal generated by the control generation unit 23 immediately before a failure when the automatic driving ECU 1 has the failure. The control signal output from the control generation unit (SCAM) 22 is the option (a) in the selection unit 26, the control signal output from the control generation unit (AD-ECU) 23 is the option (b) in the selection unit 26, and the control signal output from the control signal holding unit 24 is the option (c) in the selection unit 26.

Figure 5:
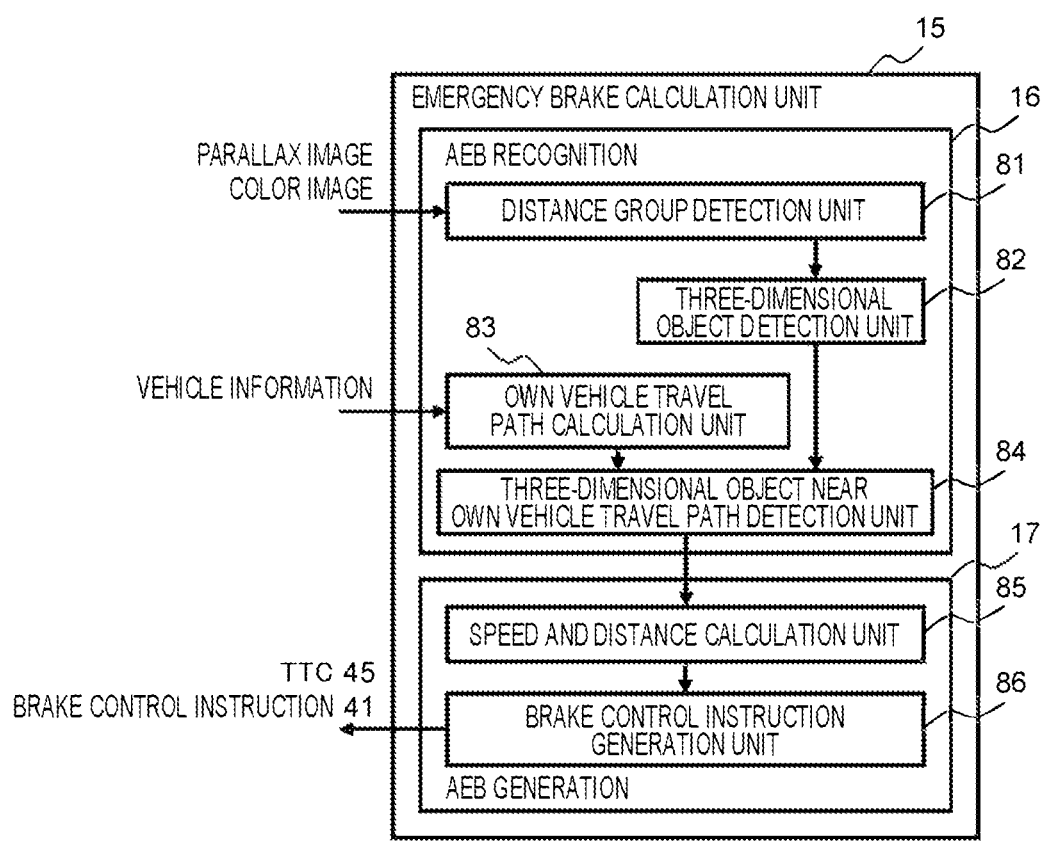
FIG. 5 is a block diagram showing a configuration of an emergency brake calculation unit according to the second embodiment.

FIG. 5 is a block diagram showing a configuration of the emergency brake calculation unit 15 according to the second embodiment.

The emergency brake calculation unit 15 has the emergency brake recognition unit (AEB recognition) 16 and the emergency brake signal generation unit (AEB generation) 17, and configures a logic necessary for calculating the time to collision 45 and the brake control instruction signal.

The emergency brake recognition unit (AEB recognition) has a distance group detection unit 81, a three-dimensional object detection unit 82, an own vehicle travel path calculation unit 83, and a three-dimensional object near own vehicle travel path detection unit 84. The distance group detection unit 81 groups pixels of the same distance from the input parallax image. The three-dimensional object detection unit 82 detects and recognizes an object using a grouped pixel group and a color image.

The own vehicle travel path calculation unit 83 calculates the own vehicle travel path, which is the track on which the vehicle travels, from the vehicle information (speed, steering angle, yaw rate, and the like) of the own vehicle. The three-dimensional object near own vehicle travel path detection unit 84 extracts an object near the own vehicle on the own vehicle travel path by using the information of the object detected by the three-dimensional object detection unit 82 and the own vehicle travel path calculated by the own vehicle travel path calculation unit 83.

The emergency brake signal generation unit (AEB generation) 17 has a speed and distance calculation unit 85 and a brake control instruction generation unit 86. The speed and distance calculation unit 85 calculates the time change of the position of the object near the own vehicle extracted by the three-dimensional object near own vehicle travel path detection unit 84, and calculates the relative distance and the relative speed with the object. The brake control instruction generation unit 86 calculates and outputs the brake control instruction 41 and the time to collision 45 from the own vehicle speed and the relative distance and relative speed of the extracted object.

As described above, the emergency brake calculation unit 15 outputs the time to collision 45, which has not been output to the outside in the past, and therefore, it is possible to stop a vehicle safely by using the time to collision 45 to quickly select the stop control by the emergency brake.

The emergency brake calculation unit 15 of the second embodiment uses the relative information (relative position, relative speed) between the own vehicle and the obstacle, and outputs not a risk value requiring a large amount of calculation, but the time to collision 45 that can be easily calculated in a short cycle, and therefore, it is possible to switch control to emergency brake control quickly and reliably, and stop the vehicle reliably.

Further, in the second embodiment, since the emergency brake calculation unit 15 is provided independently of the other ECUs, the time to collision 45 and the brake control instruction 41 can be calculated independently in a short cycle, and the time to collision 45 and the brake control instruction 41 can be output quickly. Since the emergency brake calculation unit 15 is provided in a separatable manner in a device such as an ECU, the emergency brake calculation unit 15 can be arranged in various devices.

Figure 6:
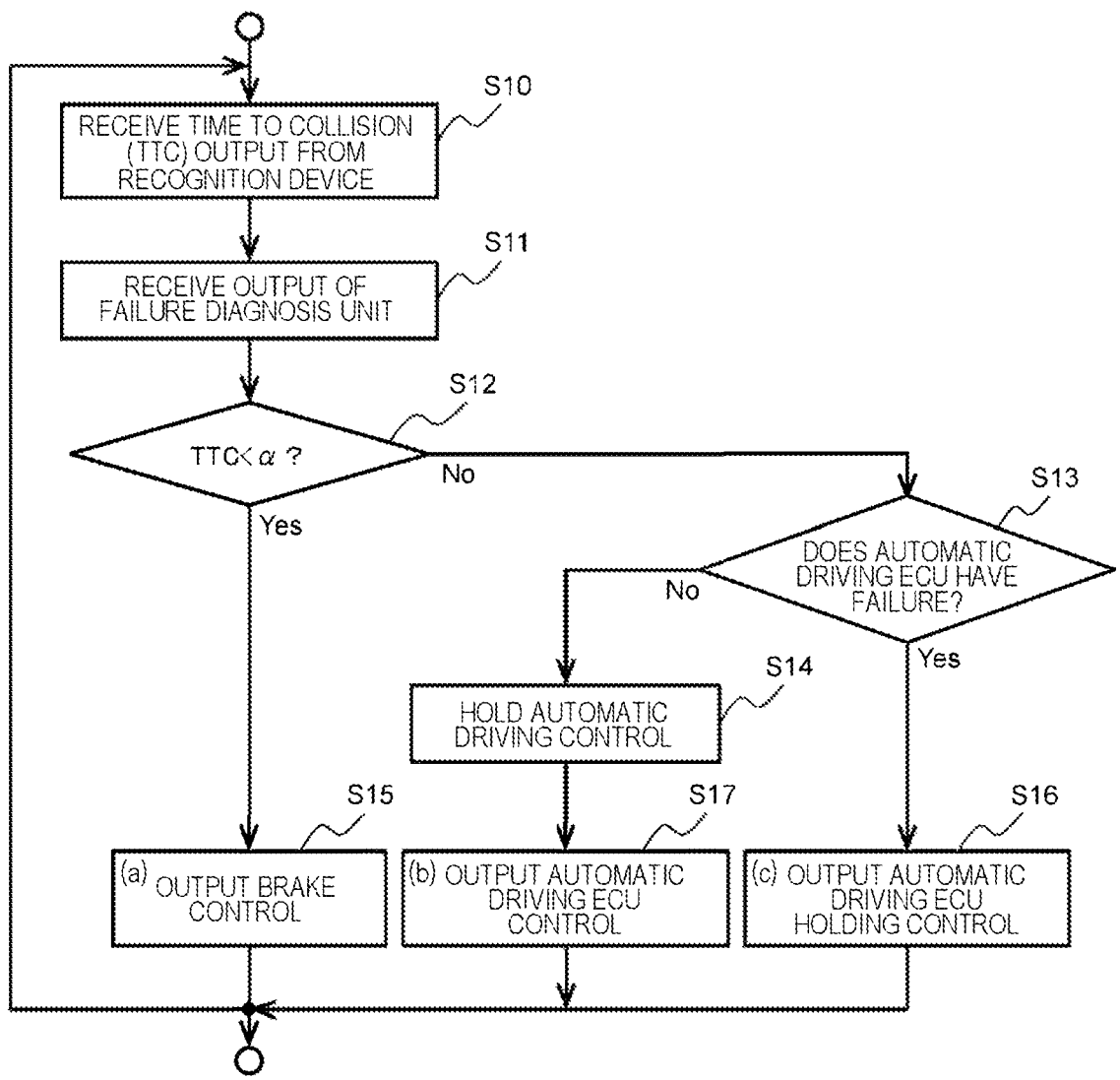
FIG. 6 is a flowchart of control selection processing of the second embodiment.

FIG. 6 is a flowchart of the control selection processing by the selection unit 26 of the vehicle motion control unit 3 of the second embodiment. The illustrated control selection processing is repeatedly performed at a predetermined timing (for example, at intervals of several tens of milliseconds).

The emergency brake calculation unit 15 of the recognition device 2 outputs the time to collision 45 and the brake control instruction 41. The failure diagnosis unit 9 notifies the vehicle motion control unit 3 of the result of periodically diagnosing the automatic driving ECU (AD-ECU failure signal 44). The vehicle motion control unit 3 receives the time to collision 45 and the brake control instruction 41 output from the recognition device 2 (S10), and receives the ADECU failure signal 44 output from the failure diagnosis unit 9 (S11).

Next, the vehicle motion control unit 3 compares the time to collision 45 with the predetermined threshold α (S12). As a result, when the time to collision 45 is smaller than the threshold α (Yes in step S12), there is a possibility of a collision in a short time, and therefore, regardless of whether the automatic driving ECU 1 has a failure, the selection unit 26 selects and outputs the emergency brake control signal (a) generated on the basis of the brake control instruction 41 output from the recognition device 2 (S15). Note that, although only one α is used as the threshold in step S12, a plurality of thresholds may be set to flexibly control the brake according to the determination result, for example, the emergency brake when the time to collision 45 is extremely short, and gradual brake when the time to collision 45 is short in a medium level. As described above, the threshold α may be changed depending on the speed of the vehicle.

On the other hand, when the time to collision 45 is equal to or greater than the threshold α (No in step S12), the possibility of collision in a short time is low, so that the vehicle motion control unit 3 determines whether the automatic driving ECU 1 has a failure on the basis of the diagnosis result output from the failure diagnosis unit 9 (S14).

As a result, if the automatic driving ECU 1 is in the normal state (No in step S14), the control signal holding unit 24 holds the control signal generated on the basis of the track control instruction 42 output by the automatic driving ECU 1 (S13). Then, the selection unit 26 selects and outputs the control signal (b) generated on the basis of the track control instruction 42 output by the automatic driving ECU 1 (S17). On the other hand, when the automatic driving ECU 1 has a failure (Yes in step S14), the selection unit 26 selects and outputs the control signal (c) output by the automatic driving ECU 1 and held by the control signal holding unit 24 when the automatic driving ECU 1 is in the normal state (S16).

As described above, when the automatic driving ECU 1 has a failure, the track control is continued with the held latest control information by the automatic driving ECU 1, and when the time to collision 45 is short due to a sudden event, regardless of whether the automatic driving ECU 1 has a failure, the control signal generated on the basis of the brake control instruction 41 output from the recognition device 2 is selected to avoid danger. Therefore, it is possible to respond to both fail-safe at the time of a failure of the automatic driving ECU 1 and danger avoidance against a sudden event, and stop the vehicle safely.

Since control is quickly and reliably switched to the emergency brake control by using, not a risk value requiring a large amount of calculation using relative information (relative position, relative speed) between the own vehicle and an obstacle, but using the time to collision 45 that can be easily calculated, it is possible to reliably stop the vehicle.

Third Embodiment

In the third embodiment, the recognition device 2 does not generate the brake control instruction 41, and the emergency brake calculation unit 50 of the automatic driving ECU 1 generates the brake control instruction 41. Note that, in the third embodiment, the mainly difference from the second embodiment will be described, the same configurations and functions as those in the second embodiment will be designated by the same reference numerals, and the description thereof will be omitted.

Figure 7:
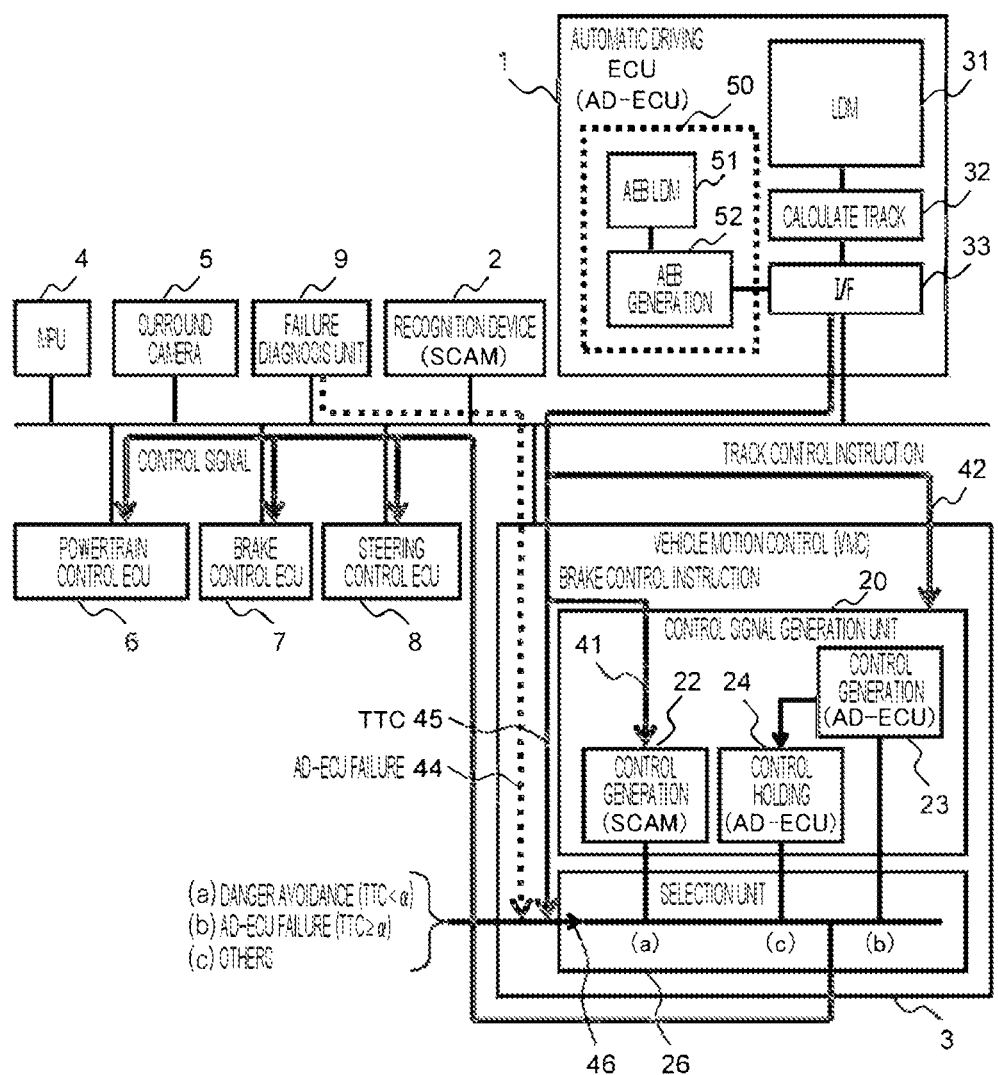
FIG. 7 is a block diagram showing a configuration of an in-vehicle electronic control system for automatic driving according to a third embodiment.

FIG. 7 is a block diagram showing a configuration of an in-vehicle electronic control system for automatic driving according to the third embodiment.

The autonomous driving ECU 1 has a local dynamic map unit (LDM) 31, a track calculation unit 32, an interface 33, and an emergency brake calculation unit 50. The emergency brake calculation unit 50 has an emergency brake local dynamic map unit (AEB LDM) 51 and an emergency brake signal generation unit (AEB generation) 52. The emergency brake local dynamic map unit 51 maps the object information acquired from the sensor to the local dynamic map. Since information not related to emergency braking is unnecessary, the amount of processing can be reduced by using only the information for the vicinity of the travel direction of the own vehicle. The emergency brake signal generation unit 52 calculates the time to collision 45 from the relative distance and relative speed with the nearest object on the own vehicle track obtained by the emergency brake local dynamic map unit 51, and generates a brake control instruction signal.

The automatic driving ECU 1 outputs the track control instruction 42 processed by the local dynamic map unit 31 and the track calculation unit 32 in a long cycle (for example, several hundred milliseconds), and the emergency brake calculation unit 50 outputs the brake control instruction 41 with high frequency and short cycle (for example, several tens of milliseconds).

In the third embodiment, the brake control instruction 41 output from the automatic driving ECU 1 is input to the control generation unit (SCAM) 22. The AD-ECU failure signal 44 output from the failure diagnosis unit 9 and the time to collision 45 output from the automatic operation ECU 1 are input to the selection unit 26 as the selection control signal 46.

Figure 8:
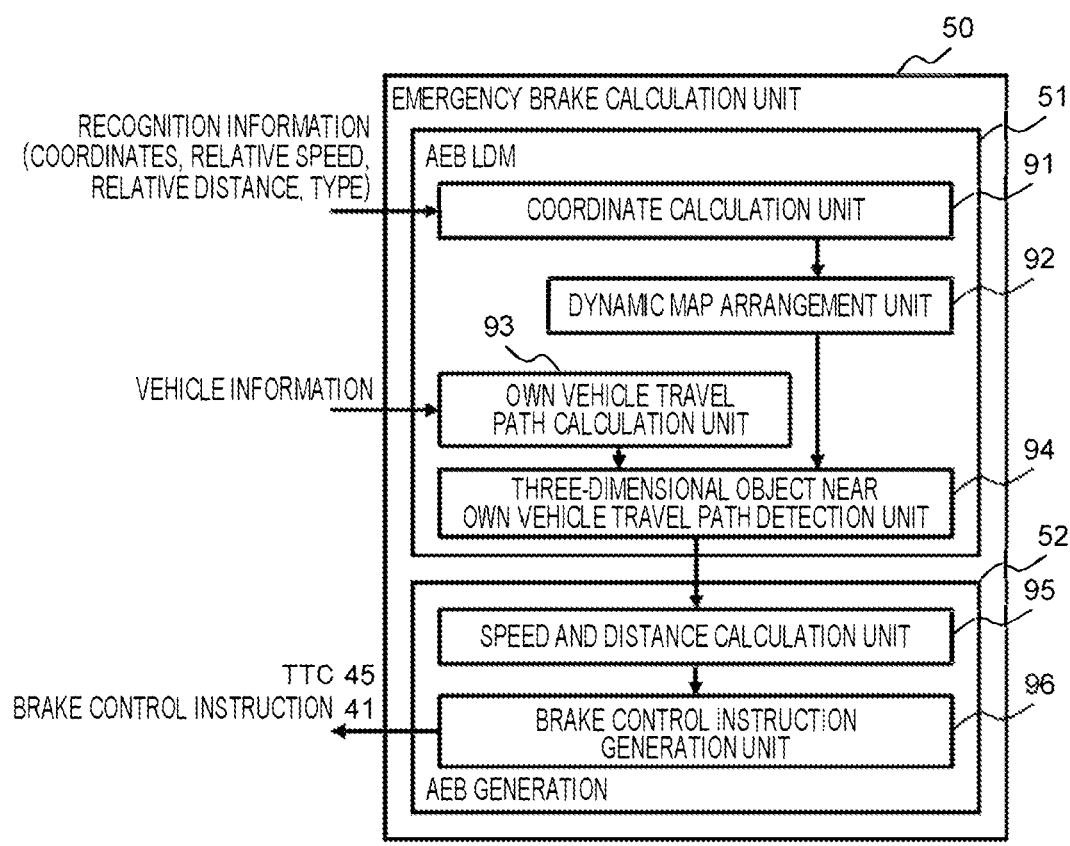
FIG. 8 is a block diagram showing a configuration of an emergency brake calculation unit according to the third embodiment.

FIG. 8 is a block diagram showing a configuration of the emergency brake calculation unit 50 according to the third embodiment.

In the second embodiment, the emergency brake calculation unit 15 of the recognition device 2 performs recognition processing using a parallax image, an edge image, an RGB image, and the like, calculates the time to collision 45, and generates the brake control instruction signal. Unlike this, the automatic driving ECU 1 receives not the image captured by the imaging device 11, but the recognition information of the object (coordinates in the camera coordinate system, relative position, relative speed, and type of each object) from sensors such as the recognition device 2 and the surround camera 5, so that the processing of the emergency brake calculation unit 50 provided in the automatic driving ECU 1 is different.

The emergency brake calculation unit 50 has a local dynamic map unit (AEB LDM) 51 and the emergency brake signal generation unit (AEB generation) 52, and configures a logic necessary for calculating the time to collision 45 and the brake control instruction signal.

The emergency brake local dynamic map unit 51 has a coordinate calculation unit 91, a dynamic map arrangement unit 92, an own vehicle travel path calculation unit 93, and a three-dimensional object near own vehicle travel path detection unit 94. The coordinate calculation unit 91 converts the coordinates of an object (three-dimensional object) around each vehicle from the camera coordinate system to the coordinate system of the automatic driving ECU 1. The dynamic map arrangement unit 92 arranges each object of which coordinates has been converted into the coordinates of the coordinate system of the automatic driving ECU 1 on the dynamic map. The own vehicle travel path calculation unit 93 calculates the own vehicle travel path, which is the track on which the own vehicle travels, from the vehicle information (speed, steering angle, and yaw rate) of the own vehicle, on the dynamic map. The three-dimensional object near own vehicle travel path detection unit 94 extracts an object near the own vehicle on the own vehicle travel path on the dynamic map.

The emergency brake signal generation unit 52 has a speed and distance calculation unit 95 and a brake control instruction generation unit 96. The speed and distance calculation unit 95 calculates, on the dynamic map, the time change of the position of the object near the own vehicle extracted by the three-dimensional object near own vehicle travel path detection unit 94, and calculates the relative distance and the relative speed with the object. The speed and distance calculation unit 95 may calculate the relative distance and the relative speed using the input recognition information. The brake control instruction generation unit 96 calculates and outputs the time to collision 45 and the brake control instruction 41 from the own vehicle speed and the relative distance and relative speed of the extracted object.

As described above, the emergency brake calculation unit 50 outputs the time to collision 45, which has not been output to the outside in the past, and therefore, the selection unit 26 can use the time to collision 45 to quickly select the stop control by the emergency brake to stop a vehicle safely.

In the third embodiment, the recognition device 2 can be configured by one or a combination of a stereo camera, a monocular camera, a laser radar, a millimeter wave radar, a LIDER, an ultrasonic sensor, and the like. In the third embodiment, since the recognition device 2 only needs to generate the brake control instruction 41 and the time to collision 45 and does not require various pieces of information, the recognition device 2 can be configured by using various sensors without limitation of the type of sensor.

Further, in the third embodiment, since the emergency brake calculation unit 50 is provided independently of the track calculation unit in the AD-ECU, the time to collision 45 and the brake control instruction 41 can be calculated independently and quickly, and the time to collision 45 and the brake control instruction 41 can be output in a short cycle. Since the emergency brake calculation unit 15 is provided in a separatable manner in a device such as an ECU, the emergency brake calculation unit 15 can be arranged in various devices.

Figure 9:
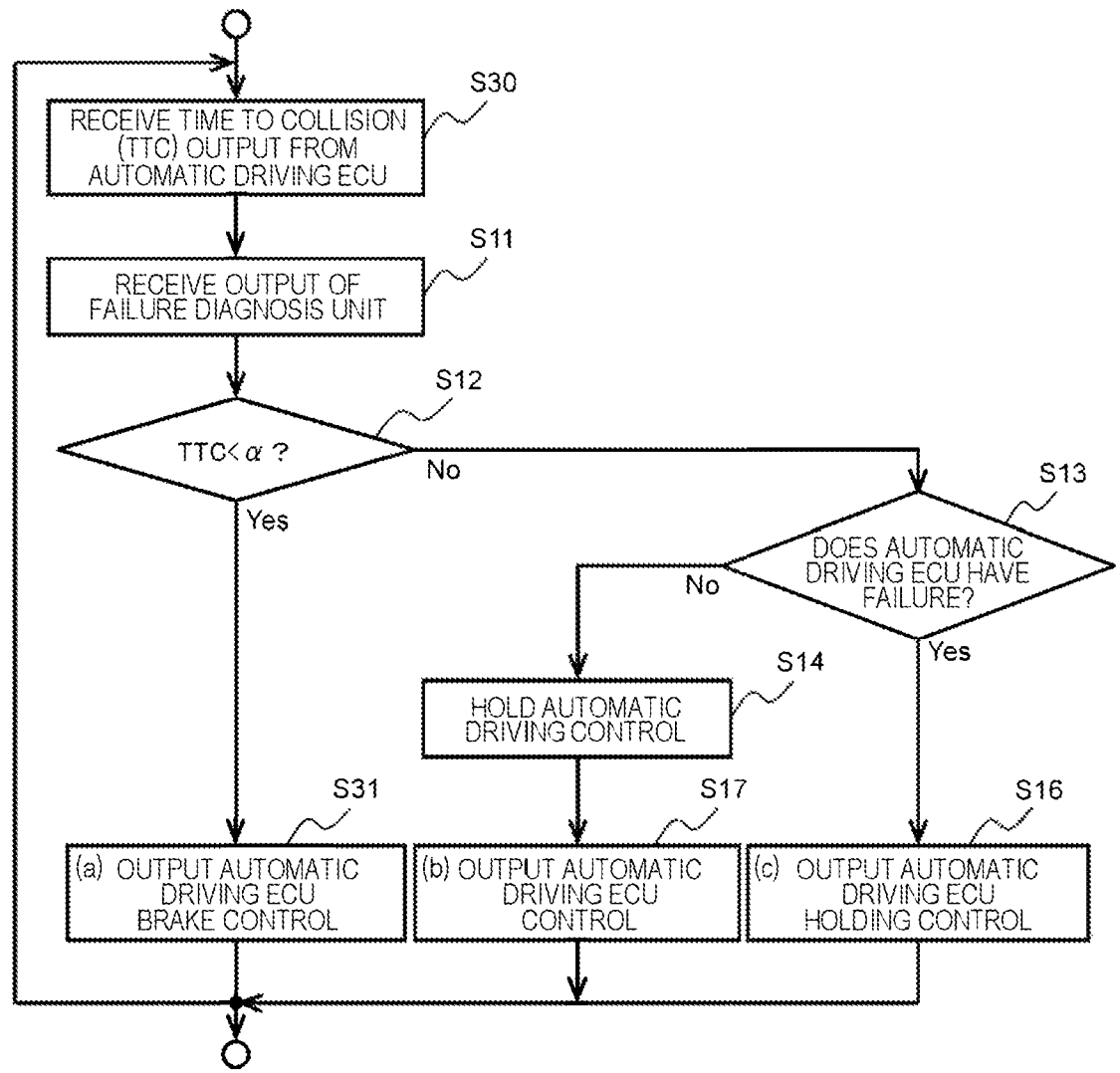
FIG. 9 is a flowchart of control selection processing of the third embodiment.

FIG. 9 is a flowchart of the control selection processing by the selection unit 26 of the vehicle motion control unit 3 of the third embodiment. In the third embodiment, the output source of the data input to the selection unit 26 is different from that in the second embodiment, but the switching procedure is almost the same. The illustrated control selection processing is repeatedly performed at a predetermined timing (for example, at intervals of several tens of milliseconds).

The emergency brake calculation unit 50 of the automatic driving ECU 1 outputs the time to collision 45 and the brake control instruction 41. The failure diagnosis unit 9 notifies the vehicle motion control unit 3 of the result of periodically diagnosing the automatic driving ECU 1 (AD-ECU failure signal 44). The vehicle motion control unit 3 receives the time to collision 45 and the brake control instruction 41 output from the automatic driving ECU (S30), and receives the AD-ECU failure signal 44 output from the failure diagnosis unit 9 (S11).

Next, the vehicle motion control unit 3 compares the time to collision 45 with the predetermined threshold $\alpha$ (S12). As a result, when the time to collision 45 is smaller than the threshold $\alpha$ (Yes in step S12), there is a possibility of a collision in a short time, and therefore, regardless of whether the automatic driving ECU 1 has a failure, the selection unit 26 selects and outputs the emergency brake control signal (a) based on the brake control instruction 41 output from the automatic driving ECU 1 (S31). Note that, although only one $\alpha$ is used as the threshold in step S12, a plurality of thresholds may be set to flexibly control the brake according to the determination result, for example, the emergency brake when the time to collision 45 is extremely short, and gradual brake when the time to collision 45 is short in a medium level. As described above, the threshold $\alpha$ may be changed depending on the speed of the vehicle.

On the other hand, when the time to collision 45 is equal to or greater than the threshold $\alpha$ (No in step S12), the possibility of collision in a short time is low, so that the vehicle motion control unit 3 determines whether the automatic driving ECU 1 has a failure on the basis of the diagnosis result output from the failure diagnosis unit 9 (S13).

As a result, if the automatic driving ECU 1 is in the normal state (No in step S13), the control signal holding unit 24 holds the control signal generated on the basis of the track control instruction 42 output by the automatic driving ECU 1 (S14). Then, the selection unit 26 selects and outputs the control signal (b) generated on the basis of the track control instruction 42 output by the automatic driving ECU 1 (S17). On the other hand, when the automatic driving ECU 1 has a failure (Yes in step S13), the selection unit 26 selects and outputs the control signal output by the automatic driving ECU 1 and held by the control signal holding unit 24 when the automatic driving ECU 1 is in the normal state (S16).

As described above, the emergency brake calculation unit may be arranged in another place such as the automatic driving ECU 1 instead of the recognition device 2, and the internal logic differs depending on the data that can be acquired by the arranged device. For example, when raw data of an image captured by a camera such as the recognition device 2 is input to the automatic driving ECU 1, the emergency brake calculation unit 50 performs recognition processing from the image, so that the emergency brake calculation unit 50 can be configured with the same logic as that in the case of being arranged in the recognition device 2.

Further, even if the image acquired by the emergency brake calculation unit 50 is not the front image captured by the recognition device 2, the image captured by the surround camera 5 can be used to avoid an object coming from the side surface of the vehicle.

As described above, in the third embodiment, when the automatic driving ECU 1 has a failure, the track control is continued with the held latest control information by the automatic driving ECU 1, and when the time to collision 45 is short due to a sudden event, regardless of whether the automatic driving ECU 1 has a failure, the control signal generated on the basis of the brake control instruction 41 output from the automatic driving ECU 1 is selected to avoid danger. Therefore, it is possible to respond to both fail-safe at the time of a failure of the automatic driving ECU 1 and danger avoidance against a sudden event, and stop the vehicle safely.

Since control is quickly and reliably switched to the emergency brake control by using, not a risk value requiring a large amount of calculation using relative information (relative position, relative speed) between the own vehicle and an obstacle, but using the time to collision 45 that can be easily calculated, it is possible to reliably stop the vehicle.

Fourth Embodiment

In a fourth embodiment, as in the second embodiment, both (1) the response when the automatic driving ECU 1 has a failure and (2) the risk avoidance against a sudden event are performed. The difference is that, at the time of a failure, in the second embodiment, fail-safe is performed, whereas in the fourth embodiment, fail operation is performed. Note that, in the fourth embodiment, the mainly difference from the second embodiment will be described, the same configurations and functions as those in the second embodiment will be designated by the same reference numerals, and the description thereof will be omitted. The fourth embodiment is also applicable to the third embodiment.

In the fail operation, it is desired not only to stop the own vehicle in the lane in which the own vehicle is traveling but also to continue driving to a safe place such as the side of the road on the basis of the latest control instruction. In order to move to a safe place, it may be necessary to change lanes by the control of the automatic driving ECU 1, and some functions of the automatic driving ECU 1 are reconstructed and operated in another ECU. In order to reconstructs some functions of the automatic driving ECU 1 in another ECU, the redundant configuration of the lockstep operation microcomputer is separated and reduced operation is performed, and some functions of the automatic driving ECU 1 are read from a flash ROM or memory to the released microcomputer to execute the reconstruction.

Figure 10:
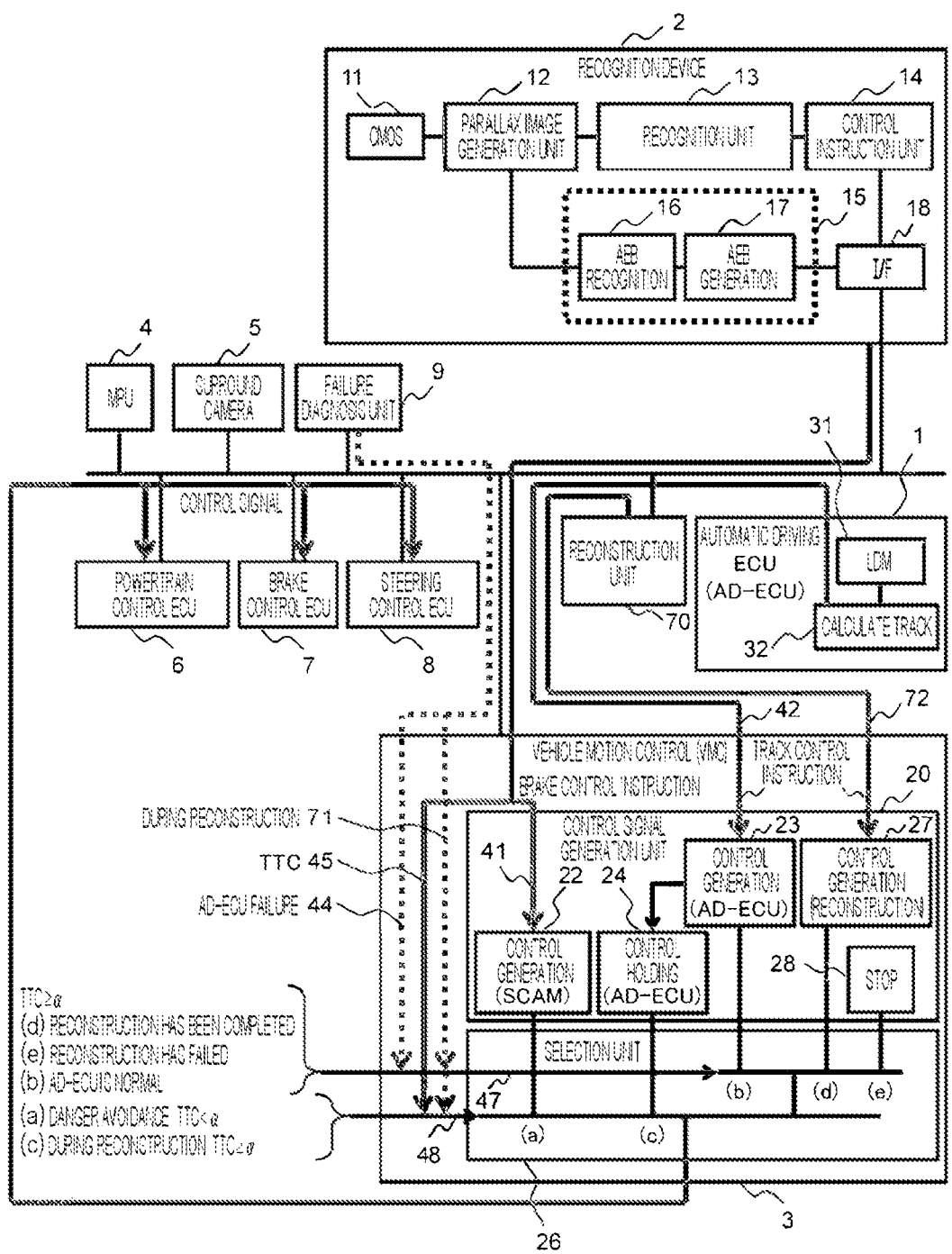
FIG. 10 is a block diagram showing a configuration of an in-vehicle electronic control system for automatic driving according to a fourth embodiment.

FIG. 10 is a block diagram showing a configuration of an in-vehicle electronic control system for automatic driving according to a fourth embodiment.

In the fourth embodiment, one of the ECUs is provided with the reconstruction unit 70. The reconstruction unit 70 may be provided in any of the ECUs, but the ECU provided with the reconstruction unit 70 is predetermined, and the program that achieves the function of the automatic driving ECU 1 that functions as the reconstruction unit 70 is stored in the flash ROM or memory of the ECU.

Further, in the fourth embodiment, the configuration of the control signal generation unit 20 and the configuration of the selection unit 26 of the vehicle motion control unit 3 are changed. The control generation unit (reconstruction) 27 of the control signal generation unit 20 generates a control signal to the ECU that controls actuators such as the powertrain, brake, and steering on the basis of the track control instruction 72 output from the reconstruction unit 70. The reconstruction unit 70 is a control unit that achieves some functions of the automatic driving ECU 1, and is only required to have a function of controlling the driving of the vehicle until the vehicle is stopped at a safe place.

In the fourth embodiment, the failure diagnosis unit 9 monitors the operation of the automatic driving ECU 1 and also monitors the operation of the reconstruction unit 70. That is, the failure diagnosis unit 9 periodically checks the operation status of the automatic driving ECU 1, and if determining that the automatic driving ECU 1 has a failure, the failure diagnosis unit 9 outputs an AD-ECU failure signal 44, and further, reconstructs some functions of the automatic driving ECU 1 in the reconstruction unit 70. Thereafter, the failure diagnosis unit 9 monitors the progress of the reconstruction processing by the reconstruction unit 70, and outputs a reconstruction signal 71 indicating the status of the reconstruction processing, that is, the success or failure of the reconstruction processing. The reconstruction signal 71 is a signal indicating whether or not the reconstruction has been completed and whether or not the reconstruction has succeeded or failed as the status of the reconstruction.

The reconstruction signal 71 is input to the selection unit 26 from the failure diagnosis unit 9. In the second embodiment, when the automatic driving ECU 1 has a failure, the control signal generated on the basis of the track control instruction 42 of the automatic driving ECU 1 immediately before the failure is used. However, in the fourth embodiment, during the reconstruction, the held control signal (c) is used, and after the reconstruction is completed, the control signal (d) generated on the basis of the track control instruction 72 output from the reconstruction unit 70 is selected. Further, when the time to collision 45 is equal to or less than a predetermined threshold regardless of whether the automatic driving ECU 1 has a failure, the automatic driving is being reconstructed, or after the reconstruction is reconstructed, the selection unit 26 selects the control signal (a) generated on the basis of the brake control instruction 41 output from the recognition device 2 to avoid a collision.

The AD-ECU failure signal 44 and the reconstruction signal 71 output from the failure diagnosis unit 9 are input to the selection unit 26 as the selection control signal 47, and the time to collision 45 and the reconstruction signal 71 output from the recognition device 2 are output to the selection unit 26 as the selection control signal 48.

Figure 11:
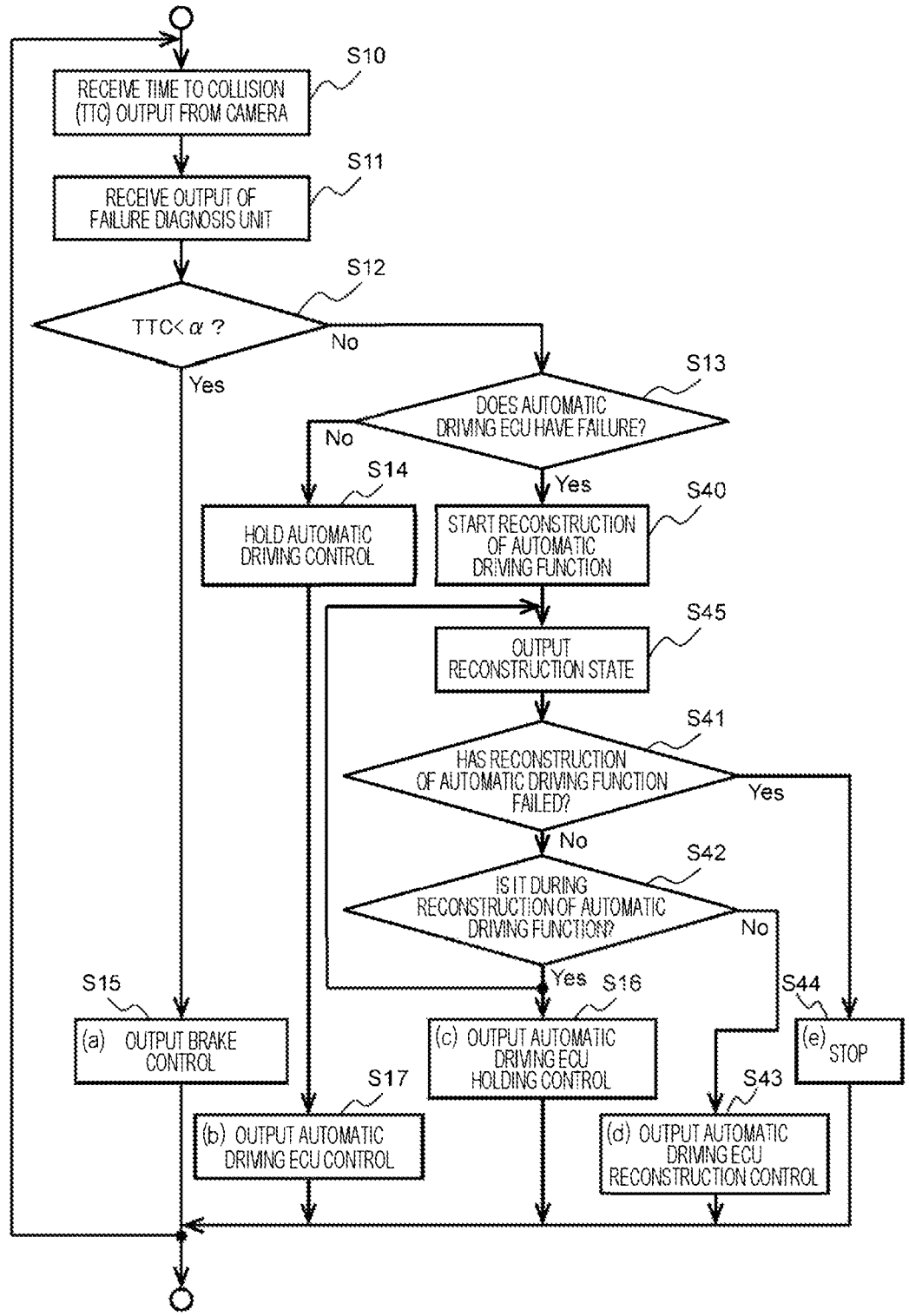
FIG. 11 is a flowchart of control selection processing of the fourth embodiment.

FIG. 11 is a flowchart of the control selection processing by the selection unit 26 of the vehicle motion control unit 3 of the fourth embodiment. The illustrated control selection processing is repeatedly performed at a predetermined timing (for example, at intervals of several tens of milliseconds).

The emergency brake calculation unit 15 of the recognition device 2 outputs the time to collision 45 and the brake control instruction 41. The failure diagnosis unit 9 notifies the vehicle motion control unit 3 of the result of periodically diagnosing the automatic driving ECU (AD-ECU failure signal 44). The vehicle motion control unit 3 receives the time to collision 45 and the brake control instruction 41 output from the recognition device 2 (S10), and receives the ADECU failure signal 44 output from the failure diagnosis unit 9 (S11).

Next, the vehicle motion control unit 3 compares the time to collision 45 with the predetermined threshold α (S12). As a result, when the time to collision 45 is smaller than the threshold α (Yes in step S12), there is a possibility of a collision in a short time, and therefore, regardless of whether the automatic driving ECU 1 has a failure, the selection unit 26 selects and outputs the emergency brake control signal (a) generated on the basis of the brake control instruction 41 output from the recognition device 2 (S15).

Note that, although only one α is used as the threshold in step S12, a plurality of thresholds may be set to flexibly control the brake according to the determination result, for example, the emergency brake when the time to collision 45 is extremely short, and gradual brake when the time to collision 45 is short in a medium level. As described above, the threshold α may be changed depending on the speed of the vehicle.

On the other hand, when the time to collision 45 is equal to or greater than the threshold α (No in step S12), the possibility of collision in a short time is low, so that the vehicle motion control unit 3 determines whether the automatic driving ECU 1 has a failure on the basis of the diagnosis result output from the failure diagnosis unit 9 (S13).

If the automatic driving ECU 1 is in the normal state (No in step S13), the control signal holding unit 24 holds the control signal generated on the basis of the track control instruction 42 output by the automatic driving ECU (S14). Then, the selection unit 26 selects and outputs the control signal (b) generated on the basis of the track control instruction 42 output by the automatic driving ECU (S17). On the other hand, when the automatic driving ECU 1 has a failure (Yes in step S13), the reconstruction unit starts the reconstruction processing of the automatic driving function (S40).

Thereafter, the failure diagnosis unit 9 outputs a reconstruction signal 71 indicating whether the reconstruction is completed (S45).

The selection unit 26 determines the success or failure of the reconstruction of some functions of the automatic driving ECU 1 of the reconstruction unit 70 by the reconstruction signal 71 (S41). When the reconstruction of the automatic driving function by the reconstruction unit 70 fails (Yes in S41), the vehicle may become uncontrollable, so the selection unit 26 selects and outputs the control signal (e) for stopping the vehicle (S44).

On the other hand, when the reconstruction by the reconstruction unit 70 has not failed (No in step S41), the vehicle motion control unit 3 determines whether the automatic driving function is being reconstructed (S42). When the reconstruction unit 70 is reconstructing the automatic driving function (Yes in step S42), the selection unit 26 selects and outputs the control signal (c) output by the automatic driving ECU 1 and held by the control signal holding unit 24 when the automatic driving ECU 1 is in the normal state (S16). The success/failure of the automatic driving function reconstruction (S41) and whether the automatic driving function is being reconstructed (S42) are repeatedly determined by the reconstruction signal 71 output from the failure diagnosis unit 9.

On the other hand, when the reconstruction unit 70 has completed the reconstruction of the automatic driving function, the selection unit 26 selects and outputs the control signal (d) generated on the basis of the track control instruction 42 for outputting the function obtained by reconstructing the automatic driving ECU in the reconstruction unit 70, by the reconstruction signal 71 output from the failure diagnosis unit 9 (S43).

As described above, in the fourth embodiment, when the automatic driving ECU 1 has a failure, the automatic driving for moving to a safe place is continued by the automatic driving function reconstructed in another ECU. When the time to collision 45 is short due to a sudden event, the control signal generated on the basis of the brake control instruction 41 output from the recognition device 2 is selected regardless of whether the automatic driving ECU 1 has a failure to avoid danger. Therefore, it is possible to perform both fail operation at the time of a failure of the automatic driving ECU 1 and danger avoidance against a sudden event, and stop the vehicle safely.

When the reconstruction of the automatic driving function by the reconstruction unit 70 fails, the control signal for stopping the vehicle is selected and output, so that the uncontrollability of the vehicle can be avoided. The reconstruction signal 71 indicating the status of reconstruction is output by the failure diagnosis unit 9 using the information from the reconstruction unit 70, but may be output directly by the reconstruction unit 70. In the fourth embodiment, the case where the reconstruction unit 70 has a failure is not considered, but even when the reconstruction unit 70 has a failure, the failure diagnosis unit 9 is only required to detect the failure of the reconstruction unit 70, and output a signal to select control for stopping the vehicle.

Fifth Embodiment

In a fifth embodiment, an example in which the selection unit 26 is provided in each of the ECUs 6 to 8 instead of the vehicle motion control unit 3 will be described. The same configurations and functions as those in the above-described embodiments are designated by the same reference numerals, and their description will be omitted. In the fifth embodiment, mainly the difference from the first embodiment will be described, but in other embodiments (each embodiment having the emergency brake calculation unit 15), the selection unit 26 may be provided in each of the ECUs 6 to 8.

Figure 12:
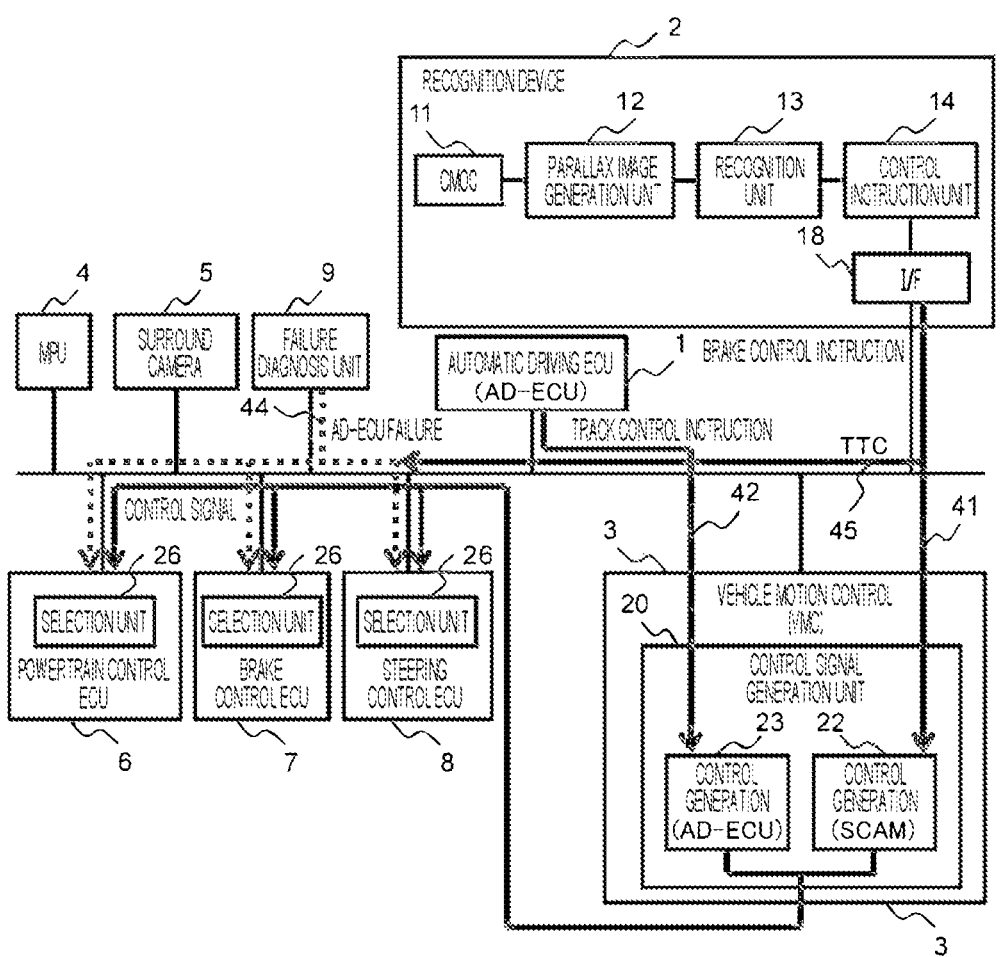
FIG. 12 is a block diagram showing a configuration of an in-vehicle electronic control system for automatic driving according to a fifth embodiment.

FIG. 12 is a block diagram showing a configuration of an in-vehicle electronic control system for automatic driving according to a fifth embodiment.

In the fifth embodiment, the vehicle motion control unit 3 has the control signal generation unit 20 and does not have the selection unit 26. Therefore, each of the powertrain control ECU 6, the brake control ECU 7, and the steering control ECU 8, which are ECUs that control various actuators that control the movement of the vehicle, has the selection unit 26. The control signal generation unit 20 of the vehicle motion control unit 3 outputs both the control signal generated on the basis of the track control instruction 42 output by the automatic driving ECU 1 and emergency brake control signal generated on the basis of the brake control instruction 41 output from the recognition device 2. The operation of the selection unit 26 is the same as that of the case where the selection unit 26 is arranged in the control signal generation unit 20 in the above-described embodiment. That is, the selection unit 26 selects any of the control signals on the basis of the diagnosis result (AD-ECU failure signal 44) output from the failure diagnosis unit 9 and the time to collision (TTC) 45 output from the recognition device 2. Each of the ECUs 6 to 8 controls various actuators (accelerator, brake, steering, and the like) using the control signal selected by the selection unit 26. The selection unit 26 may be provided in at least one ECU to be controlled, of the powertrain control ECU 6, the brake control ECU 7, and the steering control ECU 8, as necessary for control. For example, when only the emergency brake is controlled when the automatic driving ECU 1 has a failure, only the brake control ECU 7 needs to have the selection unit 26.

As described above, in the form shown in FIG. 12, the configuration of the vehicle motion control unit 3 can be simplified, and the cost of the in-vehicle electronic control system can be reduced.

Figure 13:
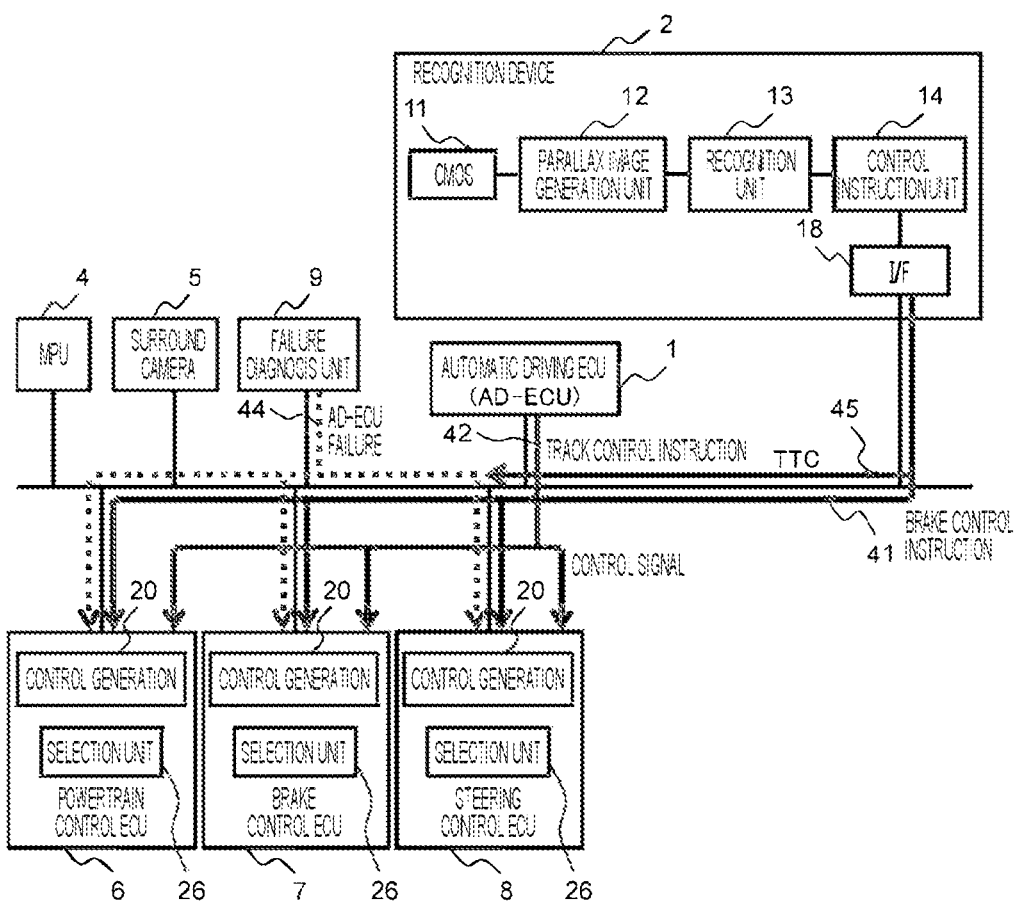
FIG. 13 is a block diagram showing a configuration of a modification of an in-vehicle electronic control system for automatic driving according to the fifth embodiment.

As shown in FIG. 13, each of the ECUs 6 to 8 may have the control signal generation unit 20 and the selection unit 26. In this case, the track control instruction 42 output from the automatic driving ECU 1 and the brake control instruction 41 output from the recognition device 2 are input to the control signal generation unit 20 of each of the ECUs 6 to 8. The control signal generation unit 20 of each of the ECUs 6 to 8 generates a necessary control signal for acceleration, brake, or steering on the basis of the track control instruction 42 output from the automatic driving ECU 1, and generates a control signal for emergency brake, acceleration, steering or the like on the basis of the brake control instruction 41 output from the recognition device 2. The selection unit 26 selects any of the control signals on the basis of the diagnosis result (AD-ECU failure signal 44) output from the failure diagnosis unit 9 and the time to collision (TTC) 45 output from the recognition device 2.

As described above, in the form shown in FIG. 13, since it is not necessary to provide the vehicle motion control unit 3, the cost of the in-vehicle electronic control system can be reduced.

Note that the present invention is not limited to the above-described embodiments, but includes various modifications and equivalent configurations within the scope of the attached claims. For example, each of the embodiments described above has been described in detail in order to explain the present invention in an easy-to-understand manner, and the present invention is not necessarily limited to those having all the configurations described in the embodiments. A part of the configuration of an embodiment may be replaced by the configuration of another embodiment. A configuration of another embodiment may be added to a configuration of an embodiment.

With respect to part of the configuration of each embodiment, other configurations may be added, deleted, or replaced.

Further, each of the above-described configurations, functions, processing units, processing means, and the like may be realized by hardware by designing a part or all of them by, for example, an integrated circuit, and may be implemented by software by a processor interpreting and executing a program for implementing each function.

Information such as programs, tables, files, and the like that realize each function can be stored in a storage device such as a memory, a hard disk, or a solid state drive (SSD), or a storage medium such as an IC card, an SD card, or a DVD.

Also, control lines and information lines indicate what is considered to be necessary for explanation, and all control lines and information lines that are required for implementation are not necessarily shown. In practice, it can be considered that almost all the structures are mutually connected.

REFERENCE SIGNS LIST

1 automatic driving ECU (AD-ECU)
2 recognition device
3 vehicle motion control unit (VMC)
4 map unit (MPU)
5 surround camera
6 powertrain control ECU
7 brake control ECU
8 steering control ECU
9 failure diagnosis unit
11 imaging device
12 parallax image generation unit
13 recognition unit
14 control instruction unit
15,50 emergency brake calculation unit
16 emergency brake recognition unit
17,52 emergency brake signal generation unit
18 camera input and output interface
20 control signal generation unit
22 control generation unit based on recognition device output
23 control generation unit based on automatic driving ECU output
24 control signal holding unit of automatic driving ECU
26 selection unit
27 control generation unit based on reconstruction unit output
31 local dynamic map unit (LDM)
32 track calculation unit
41 brake control instruction
42,72 track control instruction
44 AD-ECU failure signal
45 time to collision (TTC)
46,47,48 selection control signal
51 emergency brake local dynamic map unit
70 reconstruction unit
71 reconstruction signal

The invention claimed is:
1. An in-vehicle electronic control system comprising: a plurality of controllers which are configured to
   recognize a situation outside a vehicle;
   calculate a track on which the vehicle travels;
   diagnose a failure associated with the track; and
   output a control signal used to control the vehicle, wherein
      a track control instruction generated by a first controller is input to a control unit,
      a brake control instruction generated by a second controller is input to the control unit,
   the control signal is output from the control unit based on a control instruction selected from either the brake control instruction or the track control instruction, and
   when the failure associated with the first controller has been diagnosed, the control unit outputs the control signal based on the brake control instruction.

2. An in-vehicle electronic control system comprising: a plurality of controllers that are configured to
recognize a situation outside a vehicle;
calculate a track on which the vehicle travels;
generate a track control instruction based on the calculated track;
calculate a time to collision and a brake control instruction based on a determination result on whether emergency brake is required;
diagnose a failure associated with the calculated track;
output a control signal used to control the vehicle, wherein
the track control instruction generated by a first controller is input to a control unit and held in a memory,
the brake control instruction generated by a second controller is input to the control unit,
when the calculated time to collision is shorter than a predetermined threshold, the control unit outputs the control signal generated based on the brake control instruction, and
when the failure associated with the first controller has been detected, the control unit outputs the control signal generated based on the track control instruction held in the memory.

3. The in-vehicle electronic control system according to claim 2, wherein the plurality of controllers are also configured to
detect an object near a track of an own vehicle from a situation outside the recognized vehicle,
predict a collision with the object that has been detected, based on a relative distance and a relative speed of the object that has been detected, and
when it is predicted that the collision occurs within a predetermined time, generate the time to collision and the brake control instruction.

4. The in-vehicle electronic control system according to claim 2, wherein
when the failure associated with the track has been diagnosed, the plurality of controllers are also configured to start reconstruction of functions associated with one of the plurality of controllers,
the plurality of controllers are also configured to output a track control instruction including the track calculated by the reconstructed functions,
when the calculated time to collision is shorter than the predetermined threshold, the plurality of controllers are also configured to output a control signal generated based on the brake control instruction,
after the failure associated with the track has been calculated, and during the reconstruction, the plurality of controllers are also configured to output the held control signal, and
after the reconstruction is completed, the plurality of controllers are also configured to output the control signal generated based on the track control instruction.

5. The in-vehicle electronic control system according to claim 4, wherein when the reconstruction fails, the plurality of controllers are also configured to output a control signal that is associated with stopping the vehicle.

6. The in-vehicle electronic control system according to claim 2, further comprising:
at least one sensor of a stereo camera, monocular camera, laser radar, millimeter wave radar, LIDAR, and ultrasonic sensor, and
wherein the plurality of sensors are also configured to output the relative distance and relative speed between the own vehicle and an object that is outside of the vehicle and that has been recognized by the sensor, based on information of the object that has been recognized.

7. The in-vehicle electronic control system according to claim 2, wherein the plurality of controllers are also configured to
arrange an object, that is outside the vehicle and that has been recognized by a sensor, in a local dynamic map, and detect the object near a track of the own vehicle,
predict collision with the object that has been detected, based on a relative distance and a relative speed of the object that has been detected, and
when it is predicted that the collision occurs within a predetermined time, generate the time to collision and the brake control instruction.

8. The in-vehicle electronic control system according to claim 2, wherein the plurality of controllers are also configured to control an actuator related to motion of the vehicle by the control signal.

9. The in-vehicle electronic control system according to claim 2, wherein the control signal generated based on the brake control instruction is at least one of an emergency brake control signal configured to stop the vehicle, an acceleration control signal configured to control a vehicle speed, and a steering control signal configured to control a travel direction of the vehicle.

10. The in-vehicle electronic control system according to claim 1, further comprising:
at least one sensor of a stereo camera, a monocular camera, a laser radar, a millimeter wave radar, a LIDAR, and a ultrasonic sensor, and
the plurality of controllers output the relative distance and relative speed between the own vehicle and the object that is outside of the vehicle and that has been recognized by the at least one sensor, based on information of the object that has been recognized.

11. The in-vehicle electronic control system according to claim 1, wherein the plurality of controllers are configured to control an actuator related to motion of the vehicle by the control signal.

12. The in-vehicle electronic control system according to claim 1, wherein the control signal generated based on the brake control instruction is at least one of an emergency brake control signal for stopping the vehicle, an acceleration control signal for controlling a vehicle speed, and a steering control signal for controlling a travel direction of the vehicle.

* * * * *